United States Patent
Smiljanovski et al.

(10) Patent No.: US 11,060,435 B2
(45) Date of Patent: Jul. 13, 2021

(54) METHODS AND SYSTEMS FOR AN EXHAUST SYSTEM

(71) Applicant: Ford Global Technologies, LLC, Dearborn, MI (US)

(72) Inventors: Vanco Smiljanovski, Bedburg (DE); Joerg Kemmerling, Monschau (DE); Helmut Matthias Kindl, Aachen (DE); Hanno Friederichs, Aachen (DE); Andreas Kuske, Geulle (NL); Frank Wunderlich, Herzogenrath (DE); Frank Kraemer, Neunkirchen-Seelscheid (DE); Franz J. Brinkmann, Huerth-Efferen (DE); Lutz Henkelmann, Stolberg (DE); Franz Arnd Sommerhoff, Aachen (DE)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 16/671,713

(22) Filed: Nov. 1, 2019

(65) Prior Publication Data

US 2020/0149456 A1    May 14, 2020

(30) Foreign Application Priority Data

Nov. 13, 2018  (DE) .......................... 102018219318.5
Nov. 13, 2018  (DE) .......................... 102018219319.3

(51) Int. Cl.
*F01N 3/28* (2006.01)
*F01N 3/10* (2006.01)

(52) U.S. Cl.
CPC .......... *F01N 3/2892* (2013.01); *F01N 3/106* (2013.01); *F01N 2340/06* (2013.01)

(58) Field of Classification Search
CPC .... F01N 3/2892; F01N 3/106; F01N 2340/06; F01N 2240/20; F01N 3/101; F01N 2470/30; Y02T 10/12
USPC .................................................. 60/605.2–612
See application file for complete search history.

(56) References Cited

U.S. PATENT DOCUMENTS

| | | | | |
|---|---|---|---|---|
| 2,471,509 A | * | 5/1949 | Anderson | ............... F02B 37/00 60/605.1 |
| 4,235,076 A | * | 11/1980 | Meloche | ................... F01N 3/20 60/602 |
| 4,244,187 A | * | 1/1981 | Lane | ....................... F02B 37/18 60/602 |
| 5,279,273 A | * | 1/1994 | Nakata | .................. F01N 13/107 123/568.27 |
| 8,135,535 B2 | | 3/2012 | Karnik et al. | |
| 9,399,944 B2 | | 7/2016 | Tsuyuki et al. | |
| 9,677,499 B2 | | 6/2017 | Tsuyuki | |

(Continued)

FOREIGN PATENT DOCUMENTS

| | | |
|---|---|---|
| DE | 10250166 A1 | 4/2004 |
| DE | 102013204401 A1 | 9/2014 |

(Continued)

*Primary Examiner* — Hoang M Nguyen
(74) *Attorney, Agent, or Firm* — Geoffrey Brumbaugh; McCoy Russell LLP

(57) ABSTRACT

Methods and systems are provided for an exhaust gas system. In one example, a system comprises a conical passage fluidly coupling a turbine outlet to an aftertreatment device. The conical passage may further comprise a scavenge valve to adjust exhaust gas flow therethrough.

18 Claims, 4 Drawing Sheets

(56) References Cited

U.S. PATENT DOCUMENTS

| | | | |
|---|---|---|---|
| 9,759,127 B2 | 9/2017 | Bergman | |
| 10,473,020 B2* | 11/2019 | Zhang | F01N 3/023 |
| 2012/0204541 A1 | 8/2012 | Li et al. | |
| 2012/0312011 A1* | 12/2012 | Romblom | F02M 26/06 |
| | | | 60/605.1 |
| 2016/0298534 A1* | 10/2016 | Lotz | F01D 17/105 |
| 2016/0312687 A1* | 10/2016 | Kemmerling | F02D 41/0087 |
| 2017/0044925 A1* | 2/2017 | Myers | F02B 37/24 |
| 2018/0216540 A1* | 8/2018 | Dupuis | F02D 41/024 |

FOREIGN PATENT DOCUMENTS

| | | |
|---|---|---|
| DE | 102015207573 A1 | 10/2016 |
| DE | 102017218302 A1 | 4/2019 |
| KR | 101837559 B1 | 3/2018 |
| WO | 2006081598 A2 | 8/2006 |

* cited by examiner

METHODS AND SYSTEMS FOR AN EXHAUST SYSTEM

CROSS REFERENCE TO RELATED APPLICATIONS

The present application claims priority to German Patent Application No. 102018219319.3, filed on Nov. 13, 2018 and to German Patent Application No. 102018219318.5, filed on Nov. 13, 2018. The entire contents of each of the above-listed applications are hereby incorporated by reference for all purposes.

FIELD

The present description relates generally to an exhaust-gas aftertreatment device for an internal combustion engine with a turbocharger.

BACKGROUND/SUMMARY

In conjunction with internal combustion engines, in particular gasoline engines, air scavenging with a large overlap in the valve control timing is utilized to attain a high specific end torque. This is to be attributed to the fact that the compressor of the turbocharger can in this case be operated with high efficiency at a relatively high throughflow rate remote from the pressure surge line. This however leads to lean operation of the internal combustion engine, with an exhaust-gas/air mixture ratio lambda ($\lambda$) of only approximately 1.3 being attained. Future emissions requirements however demand an approximately stoichiometric exhaust-gas mixture or exhaust-gas/air ratio over the entire operating range. This presents certain challenges to air scavenging operations and limits the number of conditions in which it may occur.

Mixing devices for positioning between an internal combustion engine and an exhaust-gas aftertreatment device, in particular in the region of the exhaust manifold, are disclosed for example in US 2012/0204541 A1. In another previous example, U.S. Pat. No. 9,677,499 B2 describes an internal combustion engine with turbocharger, wherein a description is also given of the method for carrying out air scavenging operations, or scavenging. The scavenging gas may be mixed with an exhaust gas in an exhaust passage.

However, the inventors have realized some issues associated with the previous examples. In one example, mixing between the scavenging gas and the exhaust gas may be incomplete, leading to poorly mixed gas mixtures, which may not meet the emission requirements. As such, the previous examples of scavenging systems may not be utilized during many operating conditions.

In one example, the issues described above may be at least partially solved by an exhaust-gas aftertreatment device for an internal combustion engine with a turbocharger, which makes it possible in particular for air scavenging operations to be carried out even under stringent emissions requirements. A further object consists in providing a correspondingly advantageous motor vehicle.

The exhaust-gas aftertreatment device according to the disclosure is configured for an internal combustion engine with a turbocharger which comprises a turbine. The exhaust-gas aftertreatment device comprises an exhaust-gas inlet region arranged downstream of the turbine. The exhaust-gas inlet region comprises a valve for controlling the exhaust-gas mass flow into the exhaust-gas aftertreatment device. A system, comprising the exhaust-gas aftertreatment device comprises an exhaust gas inlet region comprising a conical shape arranged between a turbine and the aftertreatment device, and wherein a diameter of the exhaust gas inlet region increases in a direction of exhaust gas flow.

The arrangement of a valve (e.g., a scavenging valve) for controlling the exhaust-gas mass flow in the exhaust-gas inlet region has the advantage that the compressor of the turbocharger can be operated with high efficiency, and the advantages in the air scavenging can continue to be made utilizable. Furthermore, pressure pulse charging can be improved. The temperature and speed distribution of the exhaust gas at the inlet of the exhaust-gas aftertreatment device or of one or more catalytic converters can also be optimized with regard to the utilization of the catalytic converter or of the catalytic converters. Furthermore, the cold-start operation can be improved, in particular via a delayed combustion of exhaust gas downstream of the internal combustion engine in a mixing zone generated by the valve, wherein, in particular, heat losses are reduced.

The valve may be configured to be variably controllable with regard to the cross section of its opening. In other words, the flow cross section can be varied via the valve.

In an additional embodiment, the valve comprises a number of controllable guide blades. Here, the guide blades may each comprise a blade airfoil with a longitudinal axis, wherein the blade airfoil is in each case arranged such that the longitudinal axis is oriented perpendicular to a longitudinal axis of the exhaust-gas inlet region and the blade airfoil is configured to be rotatable about its longitudinal axis. It is thus possible for the cross section of the opening to be varied in a flexible manner via a corresponding rotation of the guide blades. At the same time, it is possible via the guide blades for vortex flows to be generated downstream of the valve, whereby the mixing of the exhaust-gas/air mixture is improved.

The valve may advantageously be configured to be controllable in stepped or continuous fashion with regard to the cross section of its opening. Via the control of the flow cross section, the exhaust-gas mass flow flowing to the exhaust-gas aftertreatment device can be controlled, and in this way the exhaust-gas/air mass ratio or exhaust-gas/air mixture ratio can be controlled. In this way, it is possible even for air scavenging operations to be performed without emissions requirements being violated.

In an additional embodiment, the exhaust-gas inlet region comprises a longitudinal axis. Here, the valve may be designed such that it reduces the flow cross-section in a plane perpendicular to the longitudinal axis of the exhaust-gas inlet region. This embodiment, in particular in combination with controllable guide blades, has the advantage that, downstream of the valve, a mixing region is generated in which vortex flows or recirculating flows can be generated. The valve may in particular be geometrically shaped so as to act as a vortex generator, that is to say such that vortex flows or recirculation flows are generated downstream of the valve. In this way, improved mixing of the exhaust gas with supplied air, in particular by the compressor of the turbocharger, is affected.

In a further embodiment, the exhaust-gas inlet region may be configured to open conically in a flow direction. Here, in particular, the exhaust-gas inlet region may be configured to open conically in the flow direction upstream and/or downstream of the valve. The conically opening shape in the flow direction has the advantage that enhanced mixing can be achieved downstream of the valve, because the conical opening can in particular also cause or intensify vortex flows or recirculation flows.

The internal combustion engine may be configured as a gasoline engine. Since the above-described air scavenging operations are of importance in particular in conjunction with gasoline engines, an embodiment as a gasoline engine is desired.

The motor vehicle according to the disclosure comprises an above-described exhaust-gas aftertreatment device according to the disclosure. Said motor vehicle has the features and advantages stated in conjunction with the exhaust-gas aftertreatment device according to the disclosure. The motor vehicle may be a passenger motor vehicle, a heavy goods vehicle, a bus, a minibus, a motorcycle, or a moped.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
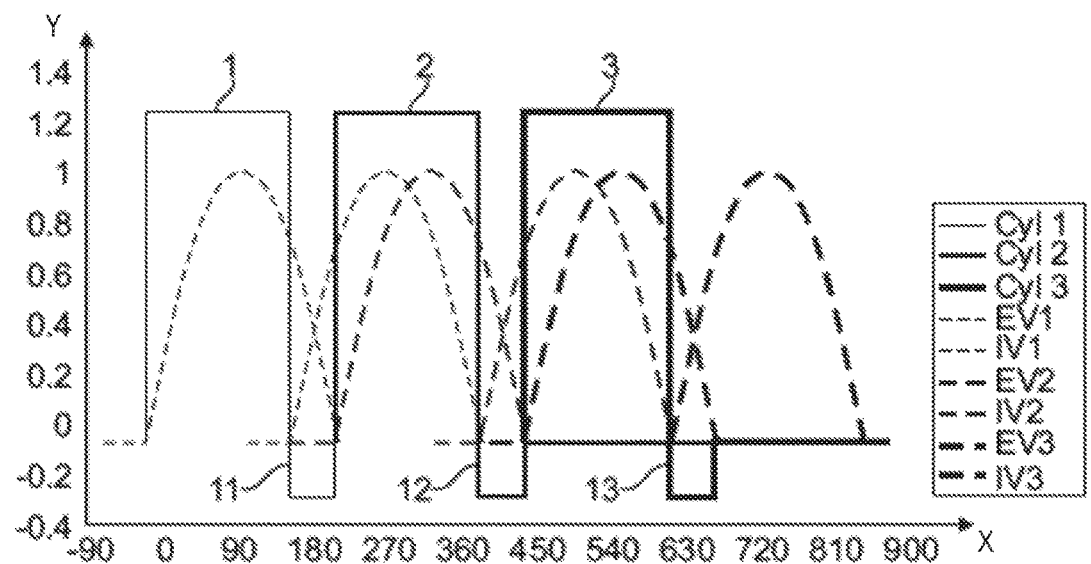
FIG. 1 schematically shows, for an internal combustion engine with three cylinders, the dependency of the exhaust-gas/air mixture ratio on the crank angle FIG. 2A schematically shows a turbine of a turbocharger and a detail of an exhaust-gas aftertreatment device according to the disclosure.
Figure 2A:
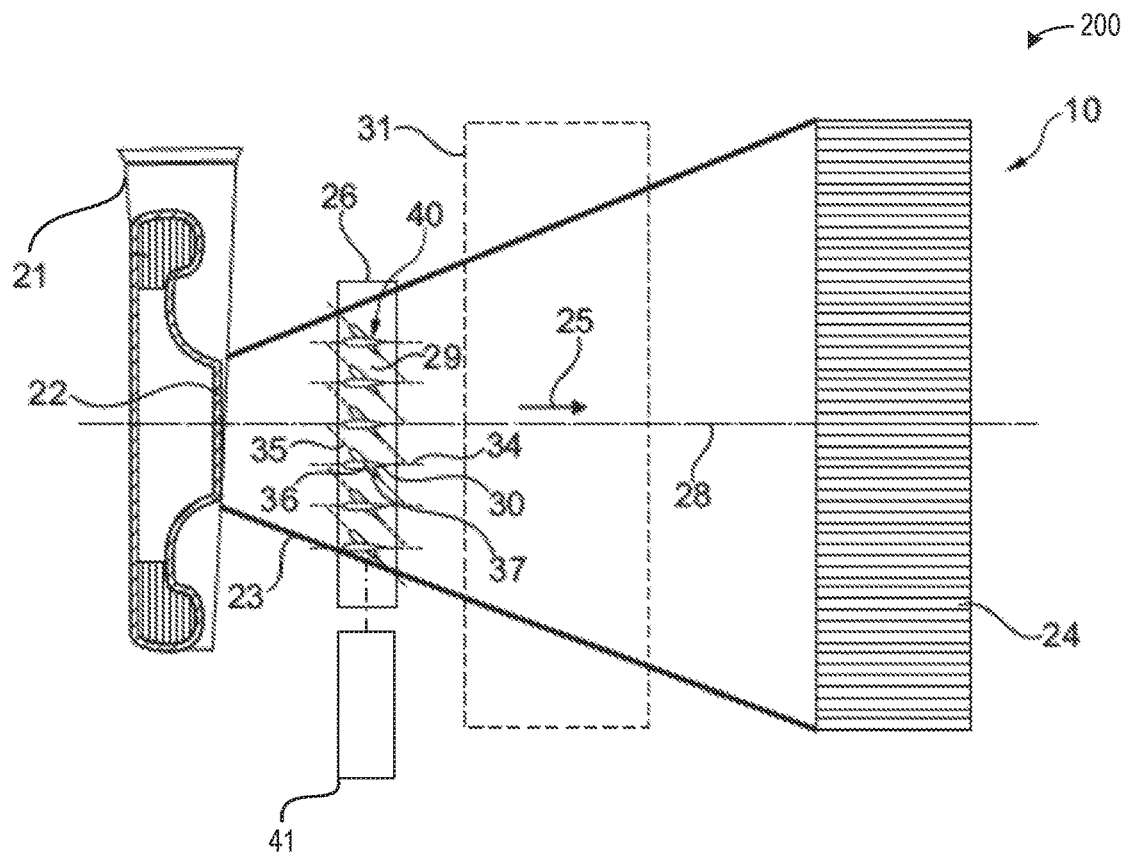
FIG. 2B schematically shows a turbine of a turbocharger and a detail of an exhaust-gas aftertreatment device according to the disclosure.
Figure 2B:
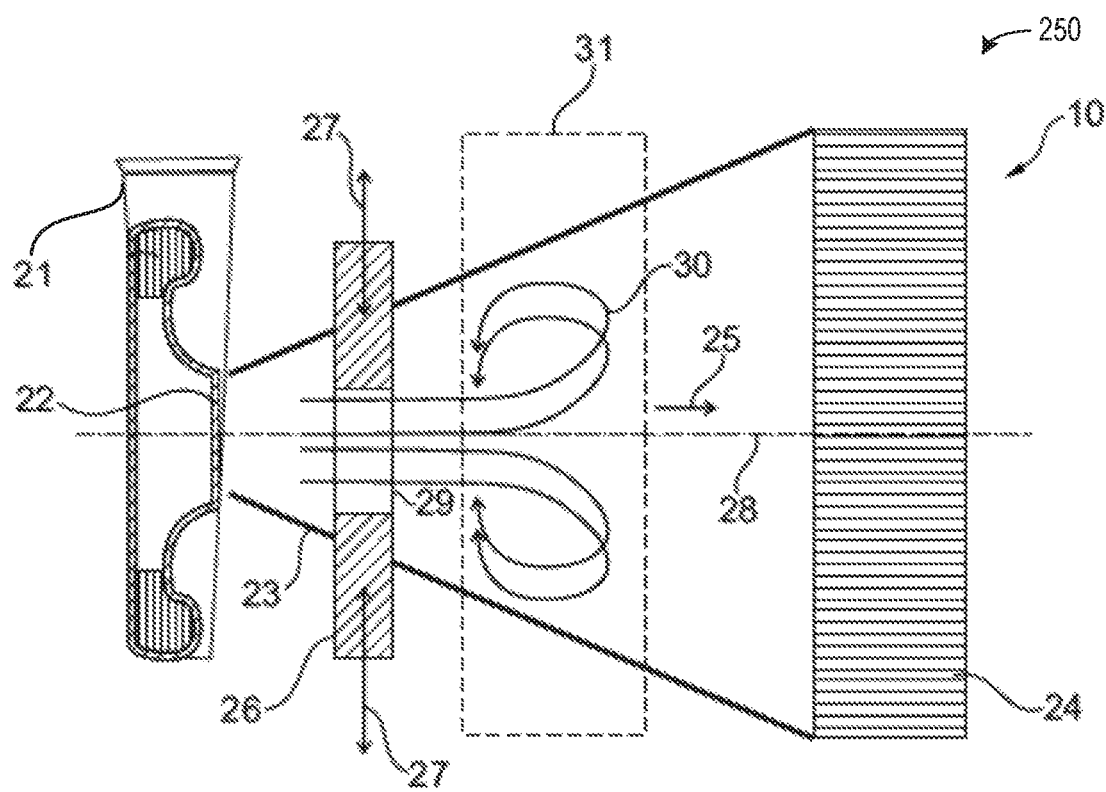
Figure 3:
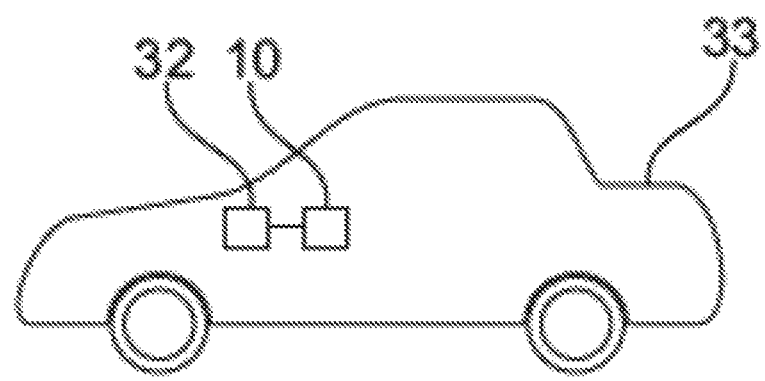
FIG. 3 illustrates an engine of a vehicle.
Figure 4:
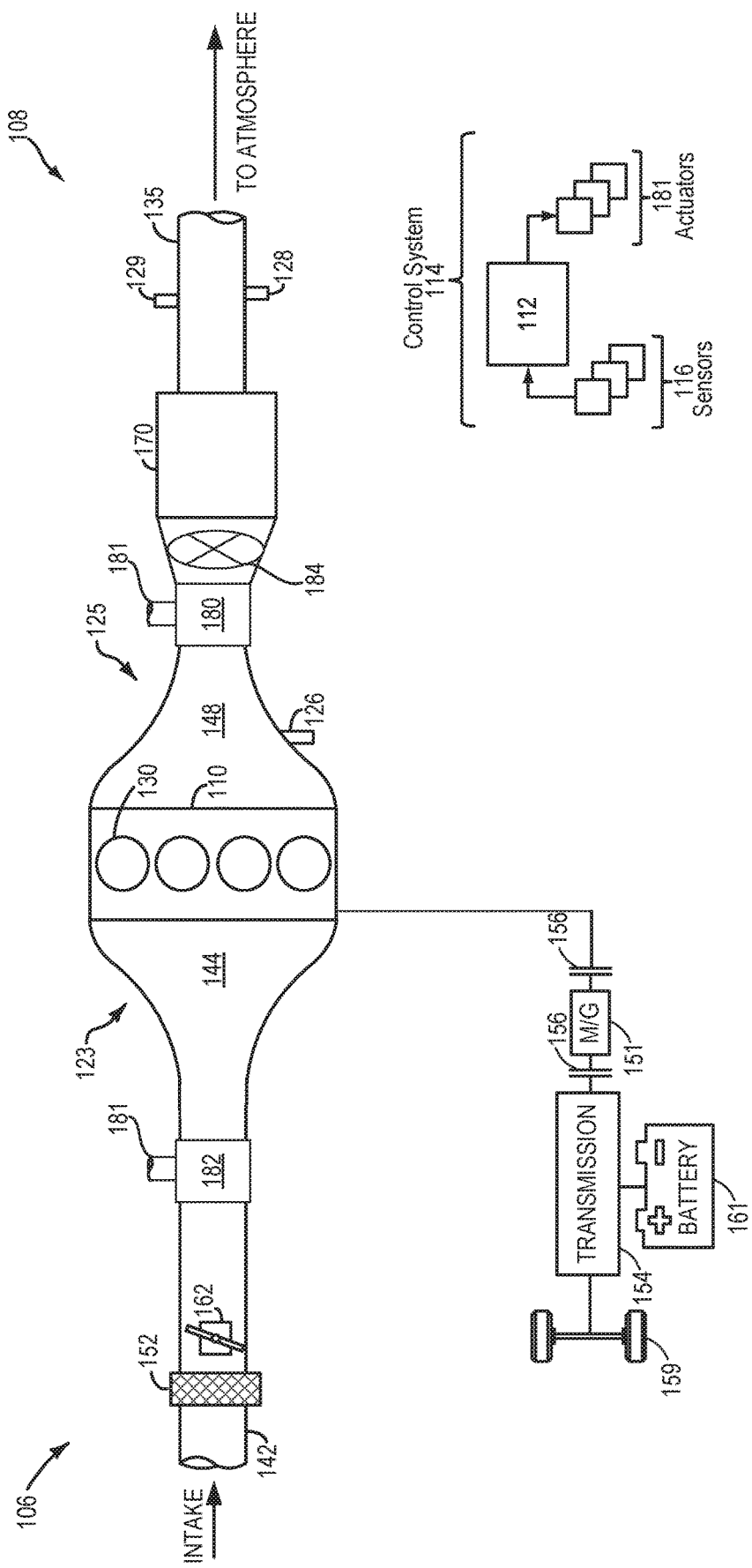
FIG. 4 shows an engine of a hybrid vehicle.
Figure 5:
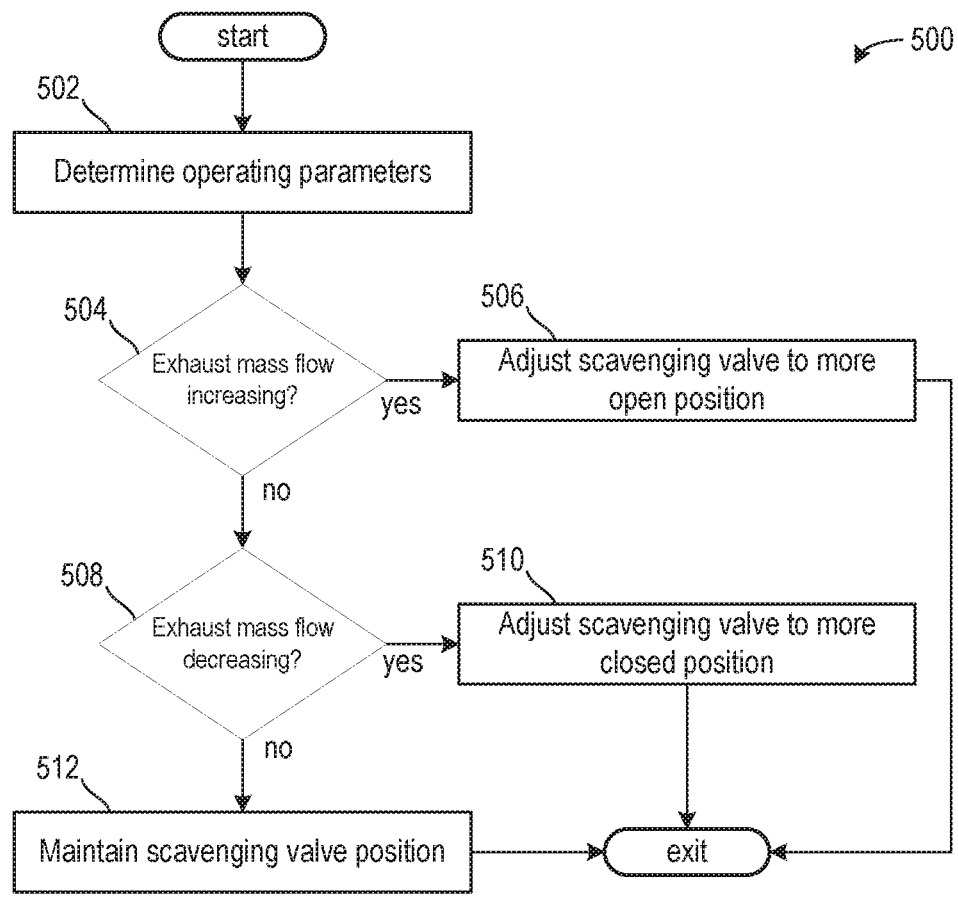
FIG. 5 shows a method for adjusting the scavenging valve to adjust mixing between a scavenging gas and an exhaust gas.

The following description relates to systems and methods for an exhaust gas system configured to improve mixing between scavenging gas and exhaust gas without overly perturbing exhaust gas flow such that intake air flow is uninterrupted. FIG. 1 schematically shows, for an internal combustion engine with three cylinders, the dependency of the exhaust-gas/air mixture ratio on the crank angle. FIG. 2A schematically shows a turbine of a turbocharger and a first embodiment of an exhaust-gas aftertreatment device. FIG. 2B schematically shows a turbine of a turbocharger and a second embodiment of an exhaust-gas aftertreatment device. FIG. 3 illustrates an engine of a vehicle. FIG. 4 shows an engine of a hybrid vehicle. FIG. 5 shows a method for adjusting the scavenging valve to adjust mixing between a scavenging gas and an exhaust gas. The scavenging gas may include air and/or exhaust gas.

In one example, the present disclosure relates to a system, comprising an exhaust passage comprising a turbine arranged upstream of an aftertreatment device relative to a direction of exhaust gas flow. An exhaust gas inlet region is arranged between the turbine and the aftertreatment device, wherein the exhaust gas inlet region comprises a conical shape, wherein a diameter of the exhaust gas inlet region increases in the direction of exhaust gas flow. A scavenging valve is arranged in the exhaust gas inlet region, the scavenging valve comprising a plurality of airfoils configured to rotate along an axis perpendicular to the direction of exhaust gas flow. A controller with computer-readable instructions stored on non-transitory memory thereof that when executed enable the controller to rotate the plurality of airfoils to more open positions in response to an exhaust gas mass flow increasing and rotate the plurality of airfoils to more closed positions in response to the exhaust gas mass flow decreasing. A plurality of actuators, wherein each actuator is configured to adjust one airfoil of the plurality of airfoils. The scavenge valve is arranged closer to the turbine than the aftertreatment device. A mixing zone is arranged between the scavenge valve and the aftertreatment device. More closed positions inhibit exhaust gas flow through the scavenge valve, and wherein the more open positions promote exhaust gas flow through the scavenge valve.

Turning now to FIG. 1, it schematically shows, for an internal combustion engine with three cylinders, the dependency of the exhaust-gas/air mixture ratio on the crank angle. In FIG. 1, the crank angle is plotted in degrees on the x-axis. The exhaust-gas/air mixture ratio is plotted on the y-axis. Here, in the case of a mixture ratio of >0, a rich mixture is present, and in the case of a mixture ratio of <0, a lean mixture ratio is present. The curve 1 denotes the mixture ratio in the first cylinder, the curve 2 denotes the mixture ratio in the second cylinder, and the curve 3 denotes the mixture ratio in the third cylinder.

Here, the ranges 11, 12, and 13 denote crank angles for which a lean mixture is generated in the respective cylinder during an air scavenging operation. Here, the curves 1, 2 and 3 denote the mixture ratio generated during an air scavenging operation. The dashed lines denote the valve lift curves of the inlet and outlet valves of the individual cylinders. IV1 and EV1 graphically represent a position of an intake valve and an exhaust valve of a first cylinder. IV2 and EV2 graphically represent a position of an intake valve and an exhaust valve, respectively, of a second cylinder. IV3 and EV3 graphically represent a position of an intake valve and an exhaust valve, respectively, of a third cylinder. As illustrated, the exhaust valve of the first cylinder may be open at a same time the intake valve of the second cylinder is open. Similarly, the exhaust valve of the second cylinder may be open at the same time the intake valve of the third cylinder is open. While not shown, the exhaust valve of the third cylinder may be open at the same time the intake valve of the first cylinder is open.

Turning now to FIG. 2A, it shows schematically shows a first embodiment 200 of an exhaust-gas aftertreatment device according to the disclosure in a longitudinal cross-section, that is to say a section along the longitudinal axis 28. In one example, gas flow through the exhaust-gas aftertreatment device 10 is parallel to the longitudinal axis 28. A turbine 21 of a turbocharger which has an outlet 22 is shown. The exhaust-gas aftertreatment device 10 comprises an exhaust-gas inlet region 23 which is connected in terms of flow to the outlet 22 of the turbine 21. Via the exhaust-gas inlet region 23, exhaust gas is conducted to a number of catalytic converters 24. In the variant shown, the exhaust-gas inlet region 23 is configured such that it opens conically in the flow direction of the exhaust gas 25 toward the number of catalytic converters 24.

In the exhaust-gas inlet region 23, there is arranged a valve 26 for controlling the exhaust-gas mass flow into the exhaust-gas aftertreatment device. The valve 26 is configured so as to be controllable in variable fashion with regard to the cross-section of its opening. The cross section of the valve opening 29 is preferably configured to be controllable in stepped or continuous fashion.

The valve 26 comprises a number and/or a plurality of guide blades 40. The guide blades 40 are configured so as to be variable, and in particular controllable in variable fashion, with regard to their orientation with respect to the longitudinal axis 28 of the exhaust-gas inlet region. The guide blades 40 comprise in each case one blade airfoil 30, 37 with a longitudinal axis 36 and with a transverse axis 34, 35 arranged perpendicular to the longitudinal axis 36. The blade airfoils 30, 37 are in each case arranged such that the longitudinal axis 36 is oriented angled to the longitudinal axis 28 of the exhaust-gas inlet region, and the blade airfoils are rotatable about their longitudinal axis 36. In one example, an actuator 41 or a plurality of actuators 41 may be configured to rotate the plurality of guide blades 40. In the example of a single actuator, each of the airfoils of the guide blades 40 are moved in tandem. In the example of a plurality of actuators, each of the airfoils 30 are moved independently. The actuator 41 an/or plurality of actuators 41 may receive signals from a controller such as the controller 112 of FIG. 4. In FIG. 2A, the reference designation 30 denotes a blade airfoil with a transverse axis 34 which is oriented parallel to the longitudinal axis 28, and the reference designation 37 denotes the same blade airfoil in a position rotated about the longitudinal axis 36, wherein the transverse axis 35 encloses an angle with the longitudinal axis 28.

Via the position of the guide blades 40 and in particular the orientation of their transverse axes 34, 35 with respect to the longitudinal axis 28 of the exhaust-gas inlet region, the cross-section of the opening of the valve 26 is controlled in variable fashion. Here, the variation of the cross section of the opening of the valve 26 may be performed in continuous or stepped fashion. In other words, the guide blades 40 may be configured to be variably controllable in continuous or stepped fashion with regard to their position.

Via the guide blades 40 and the conical design of the exhaust-gas inlet region, a mixing region 31 is generated in which vortex flows are produced, which give rise to improved mixing of the exhaust gas with air. The flow rate of the supplied exhaust gas may also be controlled in flexible fashion. In this way, a stoichiometric mixture ratio can be generated upstream of the catalytic converter 24, and air scavenging can nevertheless be maintained.

In one example, each guide blade of the plurality of guide blades 40 may comprise an actuator independently operated relative to actuators of other guide blades of the plurality of guide blades 40. As such, each guide blade may independently adjust the opening of the valve 26 to a finer degree than if a single actuator adjusted all the guide blades 40.

In this way, FIG. 2A illustrates an exhaust-gas aftertreatment device 10 for an internal combustion engine 32 having a turbocharger which comprises a turbine 21, wherein the exhaust-gas aftertreatment device 10 comprises an exhaust-gas inlet region 23 arranged downstream of the turbine (21). The exhaust-gas inlet region 23 comprises a valve 26 for controlling the exhaust-gas mass flow into the exhaust-gas aftertreatment device 10. The valve 26 is configured to be controllable in variable fashion with regard to the cross section of its opening 29. In one example, the valve 26 comprises a number of controllable guide blades 40, each of which may be independently operated or operated in tandem.

The guide blades 40 each comprise a blade airfoil 30 with a longitudinal axis 36, wherein the blade airfoil 30 is in each case arranged such that the longitudinal axis 36 is oriented perpendicular to a longitudinal axis 28 of the exhaust-gas inlet region 23 and the blade airfoil 30 is designed to be rotatable about its longitudinal axis 36.

The valve 26 is configured to be controllable in stepped or continuous fashion with regard to the cross section of its opening 29. The exhaust-gas inlet region 23 comprises a longitudinal axis 28, and the valve 26 is designed such that it reduces the flow cross section 29 in a plane perpendicular to the longitudinal axis 28 of the exhaust-gas inlet region 23. The valve 26 is geometrically shaped such that vortex flows are generated downstream of the valve 26. In one example, the exhaust-gas inlet region 23 is configured to open conically in a flow direction 25. The exhaust-gas inlet region 23 is configured to open conically in the flow direction 25 upstream and/or downstream of the valve 26.

Turning now to FIG. 2B, it shows a second embodiment 250 of an exhaust-gas aftertreatment device according to the disclosure in a longitudinal section, that is to say a section along the longitudinal axis 28. As such, components previously introduced may be similarly numbered in FIG. 2B and in subsequent figures. The second embodiment 250 may be an alternative embodiment to the first embodiment illustrated in FIG. 2A.

FIG. 2B shows a turbine 21 of a turbocharger which has an outlet 22. The exhaust-gas aftertreatment device 10 comprises an exhaust-gas inlet region 23 which is connected in terms of flow to the outlet 22 of the turbine 21. Via the exhaust-gas inlet region 23, exhaust gas is conducted to a number of catalytic converters 24. In the variant shown, the exhaust-gas inlet region 23 is configured such that it opens conically in the flow direction of the exhaust gas 25 toward the number of catalytic converters 24. That is to say, a dimeter of the exhaust-gas inlet region 23 increases in the direction of exhaust gas flow 25.

In the exhaust-gas inlet region 23, there is arranged a valve 26 for controlling the exhaust-gas mass flow into the exhaust-gas aftertreatment device. The valve 26 is configured so as to be controllable in variable fashion with regard to the cross section of its opening. This is indicated by arrows 27. In the variant shown, the valve is configured in the form of an iris diaphragm. The cross-section of the valve opening 29 can in this case be changed via a displacement of the diaphragm in direction 27 in a plane perpendicular to the longitudinal axis 28 of the exhaust-gas inlet region 23. The cross section of the valve opening 29 is preferably configured to be controllable in stepped or continuous fashion.

The flow direction of the exhaust gas flowing through the valve 26 is denoted by the reference designation 30. A mixing region 31 is generated downstream of the valve 26 owing to the diaphragm-like design of the valve 26 and the conical design of the exhaust-gas inlet region 23. Vortex flows are generated in said mixing region 31 owing to the geometrical design of the valve 26, in particular in the form of a diaphragm, as shown in FIG. 2B, and the conical shape of the exhaust-gas inlet region 23, in particular downstream of the valve 26. In this way, mixing of the exhaust gas with supplied air is improved, and the flow rate of the supplied exhaust gas can be flexibly controlled.

In one example, the second embodiment 250 of FIG. 2B illustrates an exhaust-gas aftertreatment device 10 for an internal combustion engine 32 having a turbocharger which comprises a turbine 21, wherein the exhaust-gas aftertreatment device 10 comprises an exhaust-gas inlet region 23 arranged downstream of the turbine 21, the exhaust-gas inlet region 23 comprises a valve 26 for controlling the exhaust-gas mass flow into the exhaust-gas aftertreatment device 10. The valve 26 is configured in the form of a diaphragm. In one example, the valve 26 is configured in the form of an iris diaphragm. In this way, the valve 26 may constrict the exhaust gas inlet region 23 via inflation of the diaphragm or via a mechanical actuation of one or more plates arranged in the valve 26. In one example, as the plates turn in a first direction, the exhaust gas inlet region 23 may narrow, thereby allowing less gas to flow therethrough. As the plates turn in a second direction, opposite the first direction, the exhaust gas inlet region 23 may expand, thereby allowing more gas to flow therethrough.

In this way, the first and second embodiments illustrate a system, comprising an exhaust gas inlet region comprising a conical shape arranged between a turbine and at least one aftertreatment device, and wherein a diameter of the exhaust gas inlet region increases in a direction of exhaust gas flow. A scavenging valve is arranged in the exhaust gas inlet region and configured to adjust the diameter of the exhaust gas inlet region.

In the example of the first embodiment, the scavenging valve comprises a plurality of guide blades, each guide blade comprising an airfoil configured to rotate about an axis angled to the direction of exhaust gas flow. In one example, a single actuator actuates the plurality of guide blades. Alternatively, the plurality of guide blades comprises a plurality of actuators, each actuator configured to actuate a single airfoil corresponding to each guide blade.

In the example of the second embodiment, the scavenging valve is a diaphragm. The diaphragm is inflated or deflated to adjust the diameter of the exhaust gas inlet region. Alternatively, the scavenging valve is an iris diaphragm, wherein plates of the diaphragm may be rotated to adjust an opening of the scavenging valve.

The motor vehicle 33 shown in FIG. 3 comprises an internal combustion engine 32 with a turbocharger which comprises a turbine, and an above-described exhaust-gas aftertreatment device 10 according to the invention. As already mentioned above, the motor vehicle according to the invention may be configured as a passenger motor vehicle or heavy goods vehicle or bus or motorcycle or moped. Said motor vehicle has the features and advantages already mentioned above.

A more detailed illustrated of the motor vehicle 33 is illustrated in FIG. 4, which shows a schematic depiction of a hybrid vehicle system 106 that can derive propulsion power from engine system 108 and/or an on-board energy storage device. As such, hybrid vehicle system 106 and engine system 108 may be non-limiting examples of the motor vehicle 33 and the engine 32 of FIG. 3, respectively. An energy conversion device, such as a generator, may be operated to absorb energy from vehicle motion and/or engine operation, and then convert the absorbed energy to an energy form suitable for storage by the energy storage device.

Engine system 108 may include an engine 110 having a plurality of cylinders 130. Engine 110 includes an engine intake 123 and an engine exhaust 125. Engine intake 123 includes an air intake throttle 162 fluidly coupled to the engine intake manifold 144 via an intake passage 142. Air may enter intake passage 142 via air filter 152. Engine exhaust 125 includes an exhaust manifold 148 leading to an exhaust passage 135 that routes exhaust gas to the atmosphere. Engine exhaust 125 may include one or more emission control devices 170 mounted in a close-coupled position or in a far underbody position. The one or more emission control devices may include a three-way catalyst, lean NOx trap, selective catalytic reduction (SCR) device, particulate filter, oxidation catalyst, etc. It will be appreciated that other components may be included in the engine such as a variety of valves and sensors, as further elaborated in herein. In some embodiments, wherein engine system 108 is a boosted engine system, the engine system may further include a boosting device, such as a turbocharger (not shown).

The engine system may further comprise a turbine 180, a compressor 182, and a shaft 181 mechanically coupling the turbine 180 to the compressor 182. A scavenging valve 184 is arranged between the turbine 180 and the emission control devices 170. The scavenging valve 184 may be similar to the valve 26 of FIGS. 2A and 2B. Furthermore, the emission control devices 170 may be similar to the aftertreatment devices 24 of FIGS. 2A and 2B. As illustrated, the portion (e.g., the exhaust gas inlet region) of the exhaust passage 135 between the outlet of the turbine 180 and the inlet of the emission control devices 170 is conical, wherein a diameter of the exhaust gas inlet region increases in a downstream direction, parallel to a direction of exhaust gas flow from the turbine to the emission control devices 170.

The scavenging valve 184 may be adjusted to adjust an opening of the exhaust gas inlet region to enhance scavenging and exhaust gas mixing with scavenged gas. In one example, the operation of the scavenging valve 184 is optimized to enhance inertial scavenging and wave scavenging. That is to say, the scavenging valve 184 may be adjusted to adjust a diameter of the exhaust gas inlet region to a desired diameter such that exhaust gas is quickly evacuated while delivering a negative pressure wave to a cylinder of the engine to clear it of remaining exhaust gases to increase combustion efficiency. As will be described in the method below, the scavenging valve may be adjusted to more open positions in response to an exhaust gas mass flow increasing. In one example, the exhaust gas mass flow may increase as an engine load increases. Additionally or alternatively, the scavenging valve may be adjusted to more closed positions in response to the exhaust gas mass flow decreasing. The exhaust gas mass flow may be determined via the exhaust gas sensor 126. Additionally or alternatively, the exhaust gas mass flow may be inferred based on a turbine rotation speed, which may be estimated via boost flow and/or directly measured via a sensor.

Vehicle system 106 may further include control system 114. Control system 114 is shown receiving information from a plurality of sensors 116 (various examples of which are described herein) and sending control signals to a plurality of actuators 181 (various examples of which are described herein). As one example, sensors 116 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 106. As another example, the actuators may include the throttle 162.

Controller 112 may be configured as a conventional microcomputer including a microprocessor unit, input/output ports, read-only memory, random access memory, keep alive memory, a controller area network (CAN) bus, etc. Controller 112 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 106 comprises multiple sources of torque available to one or more vehicle wheels

159. In other examples, vehicle 106 is a conventional vehicle with only an engine, or an electric vehicle with only electric machine(s). In the example shown, vehicle 106 includes engine 110 and an electric machine 151. Electric machine 151 may be a motor or a motor/generator. A crankshaft of engine 110 and electric machine 151 may be connected via a transmission 154 to vehicle wheels 159 when one or more clutches 156 are engaged. In the depicted example, a first clutch 156 is provided between a crankshaft and the electric machine 151, and a second clutch 156 is provided between electric machine 151 and transmission 154. Controller 112 may send a signal to an actuator of each clutch 156 to engage or disengage the clutch, so as to connect or disconnect crankshaft from electric machine 151 and the components connected thereto, and/or connect or disconnect electric machine 151 from transmission 154 and the components connected thereto. Transmission 154 may be a gearbox, a planetary gear system, or another type of transmission. The powertrain may be configured in various manners including as a parallel, a series, or a series-parallel hybrid vehicle.

Electric machine 151 receives electrical power from a traction battery 161 to provide torque to vehicle wheels 159. Electric machine 151 may also be operated as a generator to provide electrical power to charge battery 161, for example during a braking operation.

In this way, FIG. 4 shows an engine system, comprising an engine fluidly coupled to an exhaust passage, wherein a turbine is arranged along the exhaust passage. The engine system further comprises an exhaust gas inlet region fluidly coupling a turbine outlet to an aftertreatment device and a scavenging valve arranged in the exhaust gas inlet region configured to adjust a cross-sectional flow-through area of the exhaust gas inlet region in response to an exhaust gas mass flow, wherein the scavenging valve is a diaphragm. The exhaust gas inlet region comprises a conical shape.

The engine system further comprises a controller with computer-readable instructions stored on non-transitory memory thereof that when executed enable the controller to adjust a position of the scavenging valve in response to the exhaust gas mass flow, wherein the instructions further enable the controller to adjust a position of the scavenging valve in response to an engine load. Instructions further enable the controller to adjust the position to a more open position in response to the exhaust gas mass flow increasing or the engine load increasing. The instructions further enable the controller to adjust the position to a more closed position in response to the exhaust gas mass flow decreasing or the engine load decreasing. The instructions further enable the controller to maintain the position of the scavenging valve in response to the exhaust gas mass flow remaining constant or the engine load remaining constant.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 5, it shows a method 500 for adjusting a position of a scavenging valve, such as valve 26 of FIGS. 2A and 2B and/or scavenging valve 184 of FIG. 4. Instructions for carrying out method 500 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the method described below.

The method 500 begins at 502, which includes determining, estimating, and/or measuring one or more operating parameters. The one or more operating parameters may include but are not limited to one or more of throttle position, manifold vacuum, engine speed, engine load, engine temperature, vehicle speed, boost, EGR flow rate, and air/fuel ratio.

The method 500 proceeds to 504, which includes determining if an exhaust gas mass flow is increased. If the exhaust gas mass flow is increasing, then the method 500 proceeds to 506, which includes adjusting a position of the scavenging valve to a more open position. In the example of the first embodiment 200 of FIG. 2A, the controller signals to actuators of the guide blades to rotate about an axis perpendicular to a longitudinal axis parallel to a direction of exhaust gas flow such that the guide blades obstruct the exhaust gas inlet region less. In this way, the increased exhaust gas flow mass may flow to the aftertreatment devices more quickly via a more open (e.g., less restricted) exhaust gas inlet region, while promoting mixing exhaust gases with scavenged gases. In the example of the second embodiment 250 of FIG. 2B, the controller signals to actuators of the valve to deflate and/or rotate the valve to decrease a restriction of the exhaust gas inlet region. At any rate, the controller may command the scavenging valve to a more open position.

In one example, the scavenging valve comprises a plurality of positions including a fully open position, a fully closed position, and positions therebetween. The fully open position may correspond to a position of the valve restricting the exhaust gas inlet region the least while the fully closed position may correspond to a position of the valve restricting the exhaust gas inlet region the most. Positions therebetween may include more open and more closed positions, wherein a more open position more closely resembles the fully open position compared to a previous position and a more closed position more closely resembles the fully closed position compared to a previous position.

If the exhaust gas mass flow is not increasing at 504, then the method 500 proceeds to 508, which includes determining if the exhaust gas mass flow is decreasing. If the exhaust gas mass flow is decreasing, which may be due to an engine load decreasing, for example, then the method 500 proceeds to 510, which includes adjusting the scavenging valve to a more closed position. With respect to the first embodiment of the valve illustrated in FIG. 2A, the airfoils of the guide blades may be signaled to more closed positions, thereby increasing a restriction in the exhaust gas inlet region. With respect to the second embodiment of the valve illustrated in FIG. 2B, the valve may be inflated and/or rotated, in the case of an iris diaphragm, to increase a restriction in the exhaust gas inlet region.

If the exhaust gas mass flow is not increasing, then the method 500 proceeds to 512, which includes maintaining a scavenging valve position. As such, the guide blades or diaphragm are not adjusting to increase or decrease a restriction of the exhaust gas inlet region.

In this way, a scavenging valve may be configured to adjust a cross-sectional flow through area of an exhaust gas inlet region arranged between a turbine and aftertreatment devices to optimize scavenging characteristics and promote exhaust gas mixing with scavenged gas. The exhaust gas inlet region may further comprise a conical shape to promote scavenging at higher loads. The technical effect of the conically-shaped exhaust gas inlet region and the scavenging valve is to increase exhaust gas scavenging while enhancing mixing between the scavenged gas and the exhaust gas.

In another representation, the engine is an engine of a hybrid vehicle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
an exhaust gas inlet region comprising a conical shape arranged between a turbine and at least one aftertreatment device downstream of the turbine, wherein a diameter of the exhaust gas inlet region increases in a direction of exhaust gas flow, wherein an adjustable scavenging valve adjustable between a first position and a second position is arranged in the exhaust gas inlet region, and wherein exhaust gas flows through the scavenging valve in both the first position and the second position of the scavenging valve.

2. The system of claim 1, wherein the scavenging valve comprises a plurality of guide blades, each guide blade comprising an airfoil configured to rotate about an axis angled to the direction of exhaust gas flow.

3. The system of claim 2, wherein a single actuator actuates the plurality of guide blades.

4. The system of claim 2, wherein the plurality of guide blades comprises a plurality of actuators, each actuator configured to actuate a single airfoil corresponding to each guide blade.

5. The system of claim 1, wherein the scavenging valve is a diaphragm.

6. The system of claim 5, wherein the diaphragm is inflated or deflated to adjust the diameter of the exhaust gas inlet region.

7. The system of claim 1, wherein the scavenging valve is an iris diaphragm.

8. An engine system, comprising:
an engine fluidly coupled to an exhaust passage, wherein a turbine is arranged along the exhaust passage;
an exhaust gas inlet region downstream of the turbine and fluidly coupling a turbine outlet to an aftertreatment device; and
an adjustable scavenging valve arranged in the exhaust gas inlet region configured to expand and/or narrow a crosssectional flow-through area of the exhaust gas inlet region in response to an exhaust gas mass flow, wherein the scavenging valve is a diaphragm,
wherein the exhaust gas inlet region comprises a conical shape.

9. The engine system of claim 8, wherein the diaphragm is an iris diaphragm.

10. The engine system of claim 8, further comprising a controller with computer-readable instructions stored on non-transitory memory thereof that when executed enable the controller to adjust a position of the scavenging valve in response to the exhaust gas mass flow, wherein the instructions further enable the controller to adjust a position of the scavenging valve in response to an engine load.

11. The engine system of claim 10, wherein instructions enable the controller to adjust the position to a more open position in response to the exhaust gas mass flow increasing or the engine load increasing.

12. The engine system of claim 10, wherein the instructions enable the controller to adjust the position to a more closed position in response to the exhaust gas mass flow decreasing or the engine load decreasing.

13. The engine system of claim 10, wherein the instructions enable the controller to maintain the position of the scavenging valve in response to the exhaust gas mass flow remaining constant or the engine load remaining constant.

14. A system, comprising:
 an exhaust passage comprising a turbine arranged upstream of an aftertreatment device relative to a direction of exhaust gas flow;
 an exhaust gas inlet region arranged between the turbine and the aftertreatment device, wherein the exhaust gas inlet region comprises a conical shape, wherein a diameter of the exhaust gas inlet region increases in the direction of exhaust gas flow;
 a scavenging valve arranged in the exhaust gas inlet region, the scavenging valve comprising a plurality of airfoils configured to rotate along an axis perpendicular to the direction of exhaust gas flow; and
 a controller with computer-readable instructions stored on non-transitory memory thereof that when executed enable the controller to:
  rotate the plurality of airfoils to more open positions in response to an exhaust gas mass flow increasing; and
  rotate the plurality of airfoils to more closed positions in response to the exhaust gas mass flow decreasing.

15. The system of claim 14, further comprising a plurality of actuators, wherein each actuator is configured to adjust one airfoil of the plurality of airfoils.

16. The system of claim 14, wherein the scavenging valve is arranged closer to the turbine than the aftertreatment device.

17. The system of claim 14, wherein a mixing zone is arranged between the scavenging valve and the aftertreatment device.

18. The system of claim 14, wherein more closed positions inhibit exhaust gas flow through the scavenging valve, and wherein the more open positions promote exhaust gas flow through the scavenge valve.

* * * * *